United States Patent
Kogure

(10) Patent No.: US 9,683,639 B2
(45) Date of Patent: Jun. 20, 2017

(54) REACTION FORCE ACTUATOR AND STEERING DEVICE

(71) Applicant: Showa Corporation, Gyoda-shi (JP)

(72) Inventor: Akihiro Kogure, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/862,774

(22) Filed: Sep. 23, 2015

(65) Prior Publication Data
US 2016/0258516 A1    Sep. 8, 2016

(30) Foreign Application Priority Data

Mar. 5, 2015    (JP) ................. 2015-043996

(51) Int. Cl.
*B62D 5/04* (2006.01)
*F16H 15/50* (2006.01)
*B62D 5/00* (2006.01)

(52) U.S. Cl.
CPC ............ *F16H 15/50* (2013.01); *B62D 5/006* (2013.01); *B62D 5/043* (2013.01); *B62D 5/0415* (2013.01)

(58) Field of Classification Search
CPC ...................................... B62D 5/005
USPC ............................... 180/402, 444
See application file for complete search history.

(56) References Cited

U.S. PATENT DOCUMENTS

| | | | |
|---|---|---|---|
| 7,665,572 B2* | 2/2010 | Yamanaka | B62D 5/008 180/402 |
| 7,878,294 B2* | 2/2011 | Morikawa | B62D 5/008 180/204 |
| 8,185,270 B2* | 5/2012 | Hayama | B62D 1/163 180/402 |
| 2003/0127274 A1* | 7/2003 | Dominke | B60R 25/0211 180/402 |
| 2006/0047391 A1 | 3/2006 | Katou | |
| 2011/0024223 A1* | 2/2011 | Konrad | B62D 5/008 180/444 |
| 2013/0190988 A1* | 7/2013 | Limpibunterng | B62D 5/008 701/42 |

FOREIGN PATENT DOCUMENTS

| | | |
|---|---|---|
| DE | 10255751 A | 6/2004 |
| DE | 102006038192 A | 2/2008 |
| DE | 102008021591 A | 11/2009 |
| DE | 102008036730 A | 2/2010 |
| DE | 102009017054 A | 10/2010 |
| EP | 0124790 A | 11/1984 |

(Continued)

OTHER PUBLICATIONS

Extended European Search Report mailed Jul. 14, 2016 for the corresponding European Patent Application No. 15187033.4.

*Primary Examiner* — Tony Winner
(74) *Attorney, Agent, or Firm* — Leason Ellis LLP

(57) ABSTRACT

A reaction force actuator to be used in a steer-by-wire steering device includes an operating-side shaft, a motor, and a friction drive transmission. The operating-side shaft rotates integrally with an operating member that a driver operates. The motor includes a cylindrical motor output shaft disposed coaxially on an outer circumference of the operating-side shaft. The friction drive transmission changes a speed of a rotary motion of the motor output shaft and transmits the rotary motion to the operating-side shaft.

10 Claims, 11 Drawing Sheets

(56) References Cited

FOREIGN PATENT DOCUMENTS

| | | |
|---|---|---|
| EP | 1645488 A | 4/2006 |
| EP | 1985520 A | 10/2008 |
| JP | 2006-123857 A | 5/2006 |
| JP | 2007-245819 A | 9/2007 |
| WO | WO-2012/017886 A | 2/2012 |

* cited by examiner

REACTION FORCE ACTUATOR AND STEERING DEVICE

CROSS-REFERENCE TO RELATED APPLICATIONS

This application is based on and claims priority under 35 USC 119 from Japanese Patent Application No. 2015-043996 filed on Mar. 5, 2015, the entire content of which is incorporated herein by reference.

BACKGROUND OF THE INVENTION

1. Field of the Invention

The present invention relates to a reaction force actuator and a steering device.

2. Description of the Related Art

A steer-by-wire steering device includes a motor that applies reaction force to a steering wheel (operating member) that a driver operates (see Japanese Patent Application Publication No. 2007-245819).

Patent Document 1: Japanese Patent Application Publication No. 2007-245819

SUMMARY OF THE INVENTION

However, the motor disclosed in Japanese Patent Application Publication No. 2007-245819 is connected to a lower end of an operating-side shaft of the steering wheel. Thus, it is difficult to form a reaction force actuator in a compact size.

Therefore, an object of the present invention is to provide a compact reaction force actuator and a steering device.

In order to solve the problem, the present invention provides a reaction force actuator to be used in a steer-by-wire steering device, including: an operating-side shaft that rotates integrally with an operating member that a driver operates; a motor that includes a cylindrical motor output shaft disposed coaxially on an outer circumference of the operating-side shaft; and a friction drive transmission that changes a speed of a rotary motion of the motor output shaft and transmits the rotary motion to the operating-side shaft.

According to this configuration, the motor output shaft of the motor is disposed coaxially on the outer circumference of the operating-side shaft. That is, the operating-side shaft is disposed in a hollow portion of the cylindrical motor output shaft. Due to this, since the operating-side shaft and the motor output shaft do not overlap in the axial direction, the reaction force actuator can be made in a compact size.

The reaction force actuator may further include a connecting and disconnecting device that connects and disconnects transmission of power between the operating-side shaft and a steered wheel-side shaft connected to a steered wheel.

The transmission may include: a sun roller fixed coaxially on an outer circumference of the motor output shaft; a plurality of planetary rollers disposed on an outer circumference of the sun roller to make contact with an outer circumferential surface of the sun roller; a non-rotating ring roller that is inscribed by the planetary rollers; and a carrier that rotatably supports the planetary rollers and is fixed to the operating-side shaft.

The transmission may include: a sun roller that is fixed coaxially on an outer circumference of the motor output shaft; a plurality of planetary rollers that are disposed on an outer circumference of the sun roller so as to make contact with an outer circumferential surface of the sun roller; a non-rotating ring that is inscribed by the planetary rollers; and a carrier roller that is fixed to the operating-side shaft. Each of the planetary rollers may include a main body that makes contact with the sun roller and the ring, and a driving unit that is disposed coaxially with the main body and has a diameter different from that of the main body. The carrier roller makes contact with the driving unit. Further, the driving unit may have a truncated conical shape that is coaxial with the main body.

In order to solve the problem, the present invention also provides a steer-by-wire steering device including the reaction force actuator.

According to the present invention, it is possible to provide a compact reaction force actuator and a steering device.

DESCRIPTION OF THE PREFERRED EMBODIMENTS

First Embodiment

Figure 1:
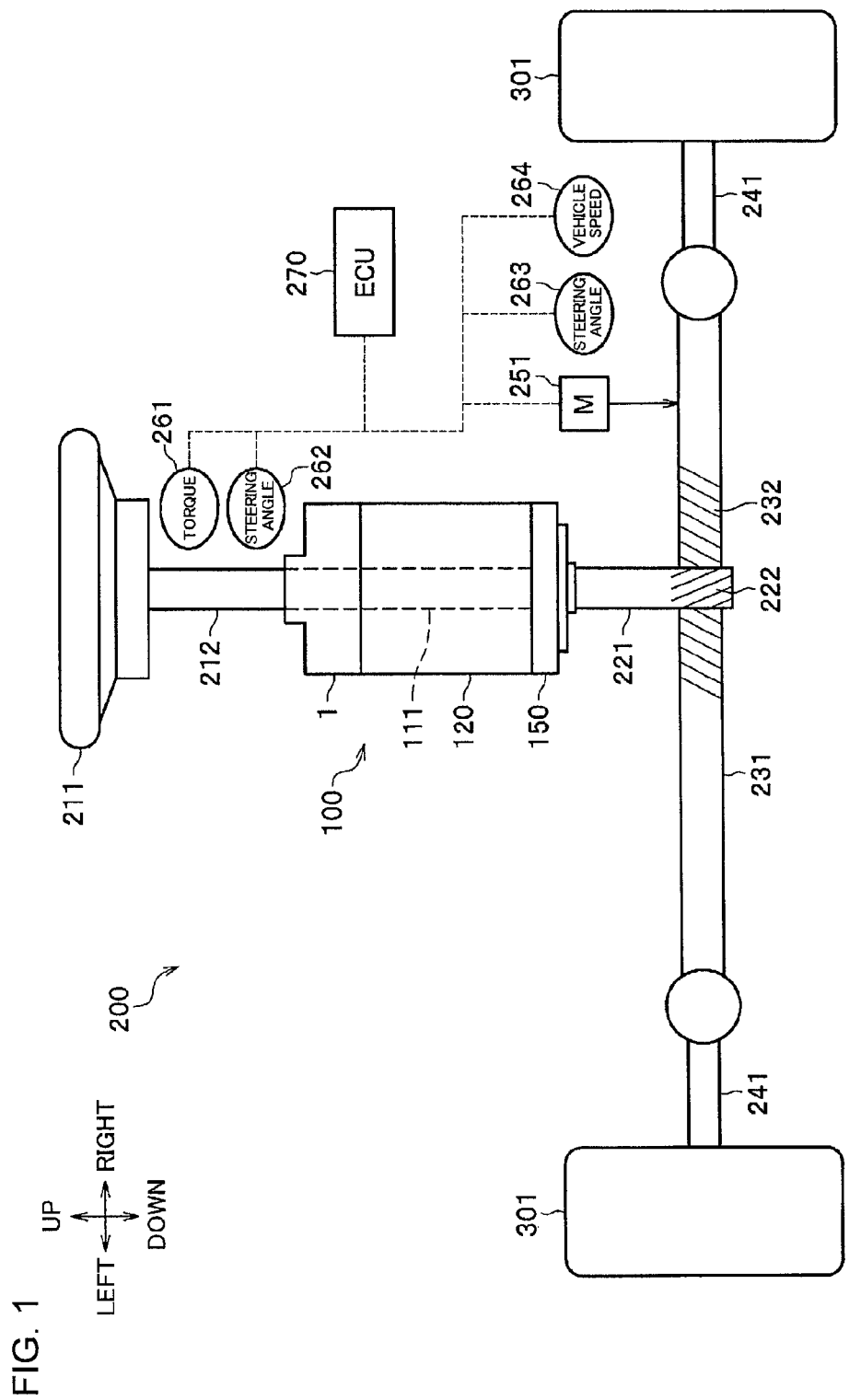
FIG. 1 is a diagram illustrating a configuration of a steering device according to a first embodiment.
Figure 2:
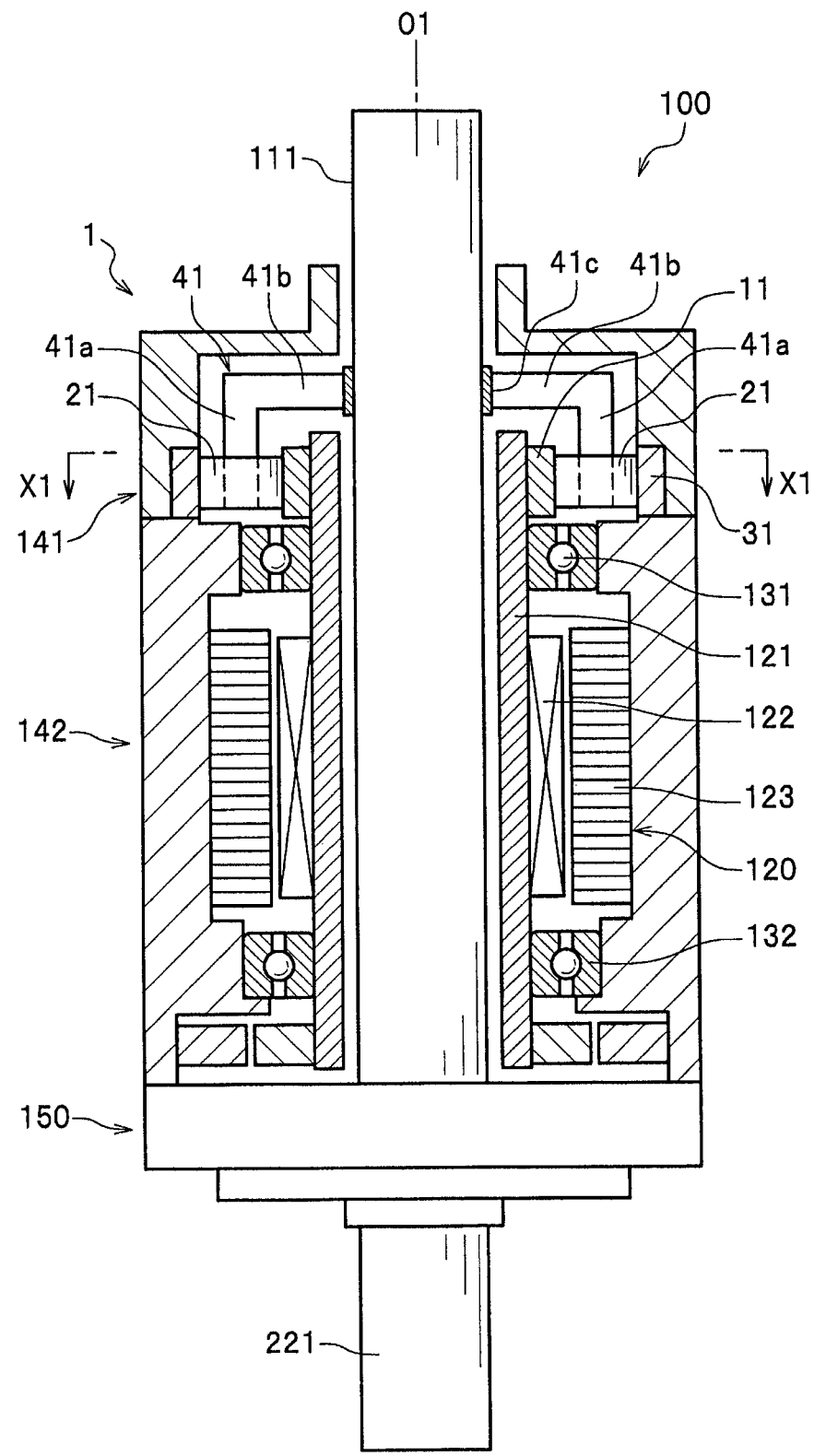
FIG. 2 is a longitudinal sectional view (along line X2-X2 in FIG. 3) of a reaction force actuator according to the first embodiment.
Figure 3:
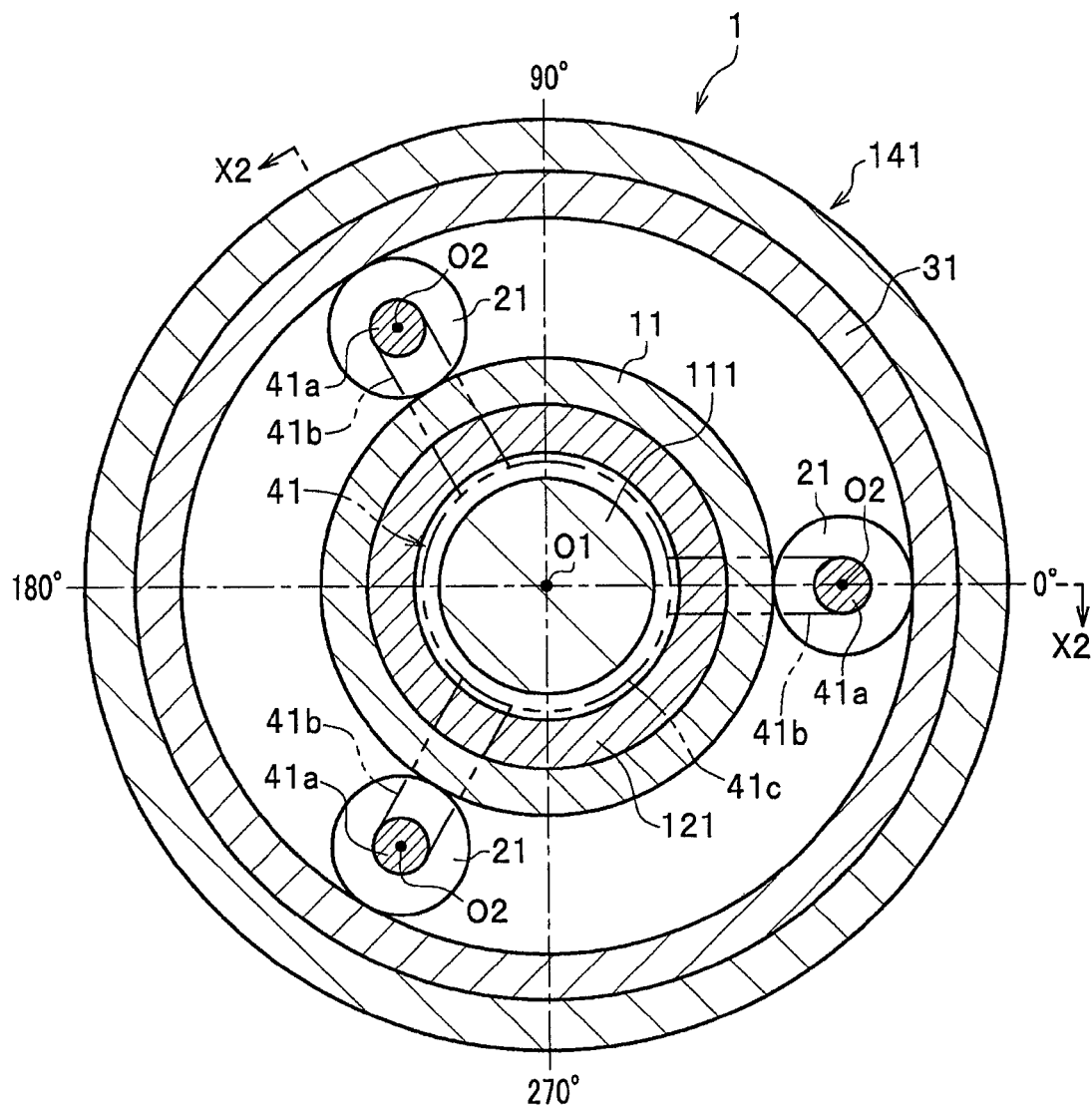
FIG. 3 is a cross-sectional view (along line X1-X1 in FIG. 2) of the reaction force actuator according to the first embodiment.
Figure 4:
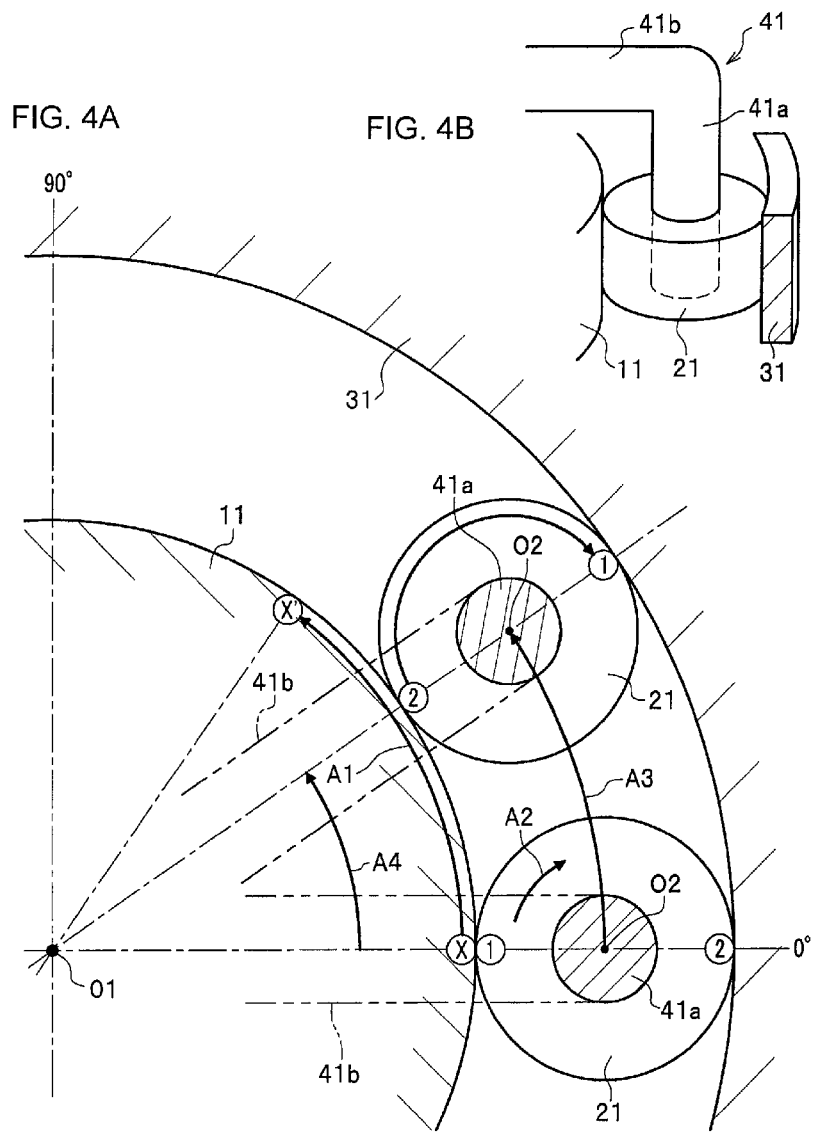
FIG. 4A is a diagram for describing an operation of the reaction force actuator according to the first embodiment and FIG. 4B is a perspective view of a planetary roller.
Figure 5:
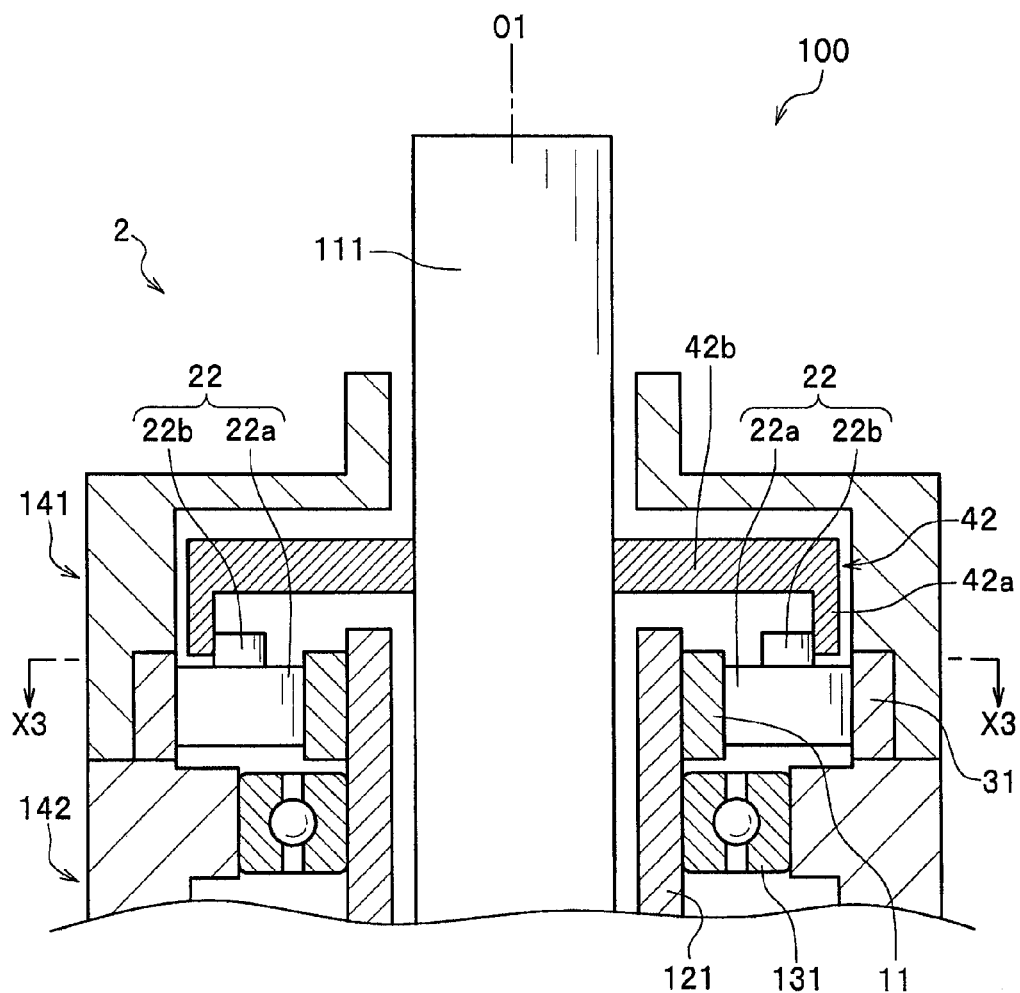
FIG. 5 is a longitudinal sectional view (along line X4-X4 in FIG. 6) of a reaction force actuator according to a second embodiment.
Figure 6:
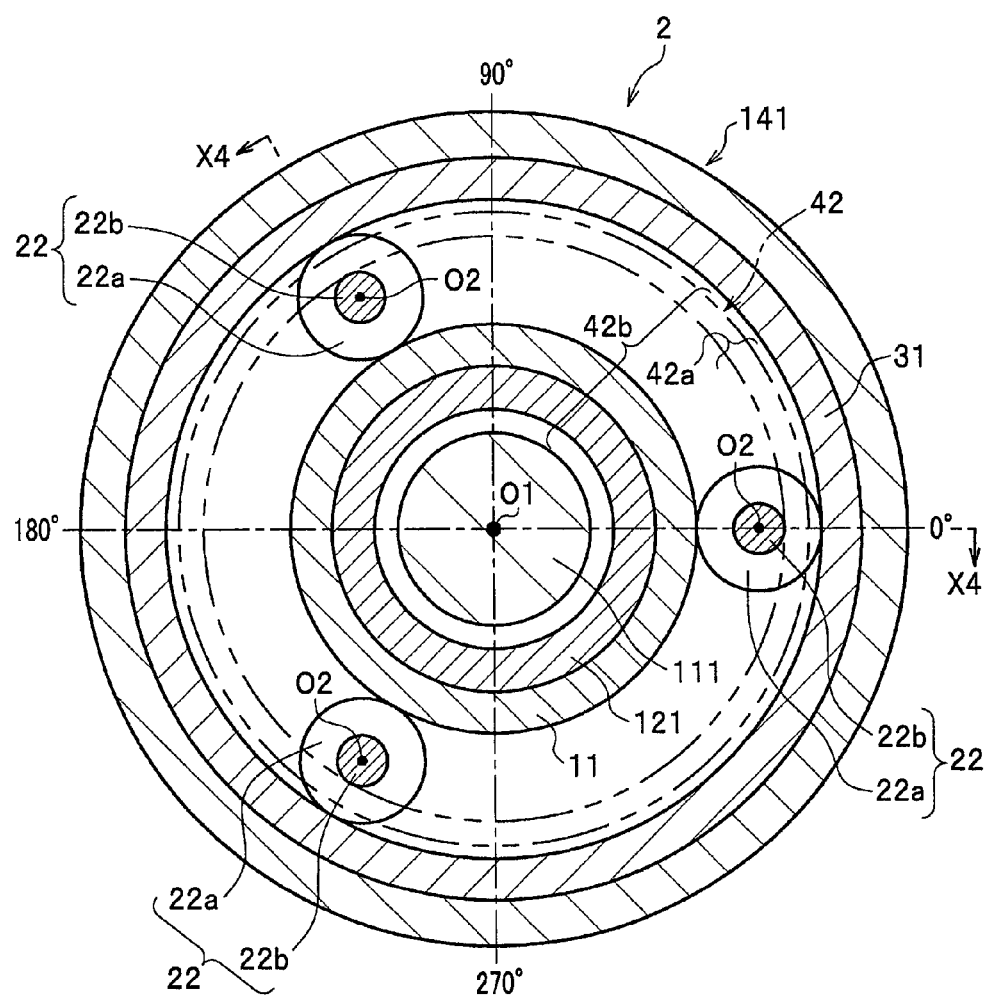
FIG. 6 is a cross-sectional view (along line X3-X3 in FIG. 5) of the reaction force actuator according to the second embodiment.

A first embodiment of the present invention will be described with reference to FIG. 1 to FIGS. 4A and 4B.
<Steering Device>

A steering device 200 is a steer-by-wire-type steering device that steers (turns) front wheels 301 (steered wheels) of a vehicle (four-wheeled vehicle) based on an amount of operation that a driver inputs to a steering wheel 211 (operating member). The steering device 200 includes a steering wheel 211, a column shaft 212, a reaction force actuator 100, a pinion shaft 221 (steered wheel-side shaft), a rack shaft 231, a steering force generator 251, an operating-side torque sensor 261 and other sensors, and an electronic control unit (ECU) 270.

<Steering Wheel>

The steering wheel 211 is an operating member that a driver operates in order to steer a vehicle.

<Column Shaft>

The column shaft 212 is a narrow and long rod-shaped member and is rotatably supported by a vehicle body with a bearing (not illustrated) interposed. An upper end (one end) of the column shaft 212 is connected to the steering wheel 211 and the column shaft 212 rotates integrally with the steering wheel 211. A lower end (the other end) of the column shaft 212 is connected to an upper end of an operating-side shaft 111 (described later). Thus, the steering wheel 211, the column shaft 212, and the operating-side shaft 111 rotate integrally. The column shaft 212 and the operating-side shaft 111 may be the same member rather than separate members.

<Pinion Shaft>

The pinion shaft 221 is a narrow and long rod-shaped member and is rotatably supported by the vehicle body with a bearing (not illustrated) interposed. Pinion teeth 222 are formed on a lower end of the pinion shaft 221, and the pinion teeth 222 engage with rack teeth 232 (described later). When the pinion shaft 221 rotates, the rack shaft 231 moves in a vehicle width direction. That is, the pinion shaft 221 is connected to the front wheels 301 and rotates according to a change in steering angle of the front wheels 301.

<Rack Shaft>

The rack shaft 231 is a narrow and long rod-shaped member, extends in a left-right direction (vehicle width direction) and is slidably supported by a housing (not illustrated) with a circular cylindrical bush (not illustrated) interposed. The housing is a cylindrical casing that accommodates the rack shaft 231 and is fixed to the vehicle body. The rack teeth 232 that engage with the pinion teeth 222 are formed on the rack shaft 231. The rack teeth 232 and the pinion teeth 222 form a rack-and-pinion mechanism.

The left and right ends of the rack shaft 231 (turning shaft) are connected to the front wheels 301 by tie rods 241. When the rack shaft 231 moves in the left-right direction, the front wheels 301 are steered (turned). That is, the pinion shaft 221 is connected to the front wheels 301 by the rack shaft 231. A linear motion in an axial direction of the rack shaft 231 when the front wheels 301 make a turn is converted to a rotary motion of the pinion shaft 221 by the rack-and-pinion mechanism.

<Steering Force Generator>

The steering force generator 251 is a device that generates steering force for steering (turning) the front wheels 301 and steers the front wheels 301 with the steering force. The steering force generator 251 may be a belt rack-type generator, a dual-pinion-type generator, or a pinion-type generator, for example.

In the case of a belt rack-type generator, the steering force generator 251 includes an electric motor that is driven according to a command from the ECU 270 to generate steering force, a ball screw that converts a rotary motion into a reciprocating motion of the rack shaft 231, and a belt mechanism as disclosed in Japanese Patent Application Publication No. 2013-226880, for example. The ball screw includes a screw rod that reciprocates integrally with the rack shaft 231 and a nut that screws with the screw rod. The belt mechanism includes a drive pulley fixed to an output shaft of the motor, a driven pulley fixed to the nut, and a belt stretched across the drive pulley and the driven pulley.

In the case of a dual-pinion-type generator, the steering force generator 251 includes an electric motor, another pinion shaft separate from the pinion shaft 221, and a worm gear mechanism that transmits rotating force of the motor to the other pinion shaft as disclosed in Japanese Patent Application Publication No. 2014-184769, for example. In the case of a pinion-type generator, the steering force generator 251 includes an electric motor and a worm gear mechanism that transmits rotating force of the motor to the pinion shaft 221 as disclosed in Japanese Patent Application Publication No. 2014-189108, for example.

In addition to the above-mentioned generators, the steering force generator 251 may include an electric motor having a hollow portion on its axial line, a screw rod that is inserted into the hollow portion and is integrated with the rack shaft, and a nut that screws with the screw rod and is fixed coaxially to a hollow output shaft of the motor.

<Sensor and the Like>

The operating-side torque sensor 261 detects an operating-side torque generated by the column shaft 212 and outputs the torque to the ECU 270. The operating-side torque sensor 261 may be a magnetostrictive sensor or a sensor that uses a torsion bar, for example.

An operating-side steering angle sensor 262 detects an operating-side steering angle of the column shaft 212 (the steering wheel 211) and outputs the angle to the ECU 270.

A wheel-side steering angle sensor 263 detects a wheel-side steering angle of the pinion shaft 221 (the front wheels 301) and outputs the angle to the ECU 270.

A vehicle speed sensor 264 detects a vehicle speed and outputs the speed to the ECU 270.

<ECU>

The ECU 270 is a control unit that controls the steering device 200 electronically and includes a CPU, a ROM, a RAM, various interfaces, electronic circuits, and the like. The ECU 270 controls various devices according to a program stored therein and executes various processes to control various devices.

The ECU 270 controls the steering force generator 251 so that the steering force generated by the steering force generator 251 increases as the operating-side torque and/or the operating-side steering angle increases, for example.

Moreover, the ECU 270 controls the reaction force actuator 100 so that the reaction force generated by the reaction force actuator 100 increases as the vehicle speed increases.

<Reaction Force Actuator>

The reaction force actuator 100 will be described.

The reaction force actuator 100 is an actuator that applies reaction force to the steering wheel 211. The reaction force actuator 100 includes, for example, the operating-side shaft 111, a motor 120, bearings 131, a first housing 141, a clutch 150, and a speed reduction device 1 (transmission).

<Operating-Side Shaft>

The operating-side shaft 111 is a circular columnar member and is supported by bearings (not illustrated) so as to freely rotate about an axial line O1. An upper end of the operating-side shaft 111 is connected to the column shaft 212 and rotates integrally with the column shaft 212 (the steering wheel 211).

<Motor>

The motor 120 is a power source that is driven according to a command from the ECU 270 so as to generate reaction force to be applied to the steering wheel 211. The motor 120 includes a motor output shaft 121, a rotor 122, and a stator 123.

The motor output shaft 121 is an output shaft that rotates about the axial line O1 when the motor 120 is driven. The motor output shaft 121 has a circular cylindrical shape and has a larger diameter than the operating-side shaft 111. The motor output shaft 121 is disposed coaxially on an outer circumference (the outer side in the radial direction) of the operating-side shaft 111. The motor output shaft 121 is shorter than the operating-side shaft 111, and the operating-side shaft 111 protrudes from the upper and lower-end openings of the motor output shaft 121. The motor output shaft 121 are rotatably supported on the first and second housings 141 and 142 with the bearings 131 and 132 interposed, respectively.

The rotor 122 is a rotating member that rotates about the axial line O1 when the motor 120 is driven. The rotor 122 has a circular cylindrical shape and is fixed in a state in which the motor output shaft 121 passes through a hollow portion of the rotor 122. A permanent magnet (not illustrated) for generating rotating force based on magnetic field generated by the stator 123 is embedded in the rotor 122.

The stator 123 is a device that generates magnetic field for rotating the rotor 122 according to a command from the ECU 270. The stator 123 has a circular cylindrical shape and is disposed on the outer circumference (the outer side in the radial direction) of the rotor 122 about the axial line O1. The stator 123 includes a stator body having a plurality of circular cylindrical teeth extending inward in the radial direction and a coil wound around each tooth. The plurality of coils are allocated to U, V, and W-phases in the circumferential direction and are connected to a power supply (for example, a 12-V battery) via an inverter (not illustrated). When the ECU 270 controls the inverter, 3-phase AC current flows into the stator 123 and magnetic field is generated.

<Bearing>

The bearings 131 and 132 support the motor output shaft 121 in relation to the second housing 142 so as to freely rotate. In the present embodiment, the bearings 131 and 132 are ball bearings.

<First Housing and the Like>

The first and second housings 141 and 142 are casings that form an outer shell of the reaction force actuator 100. The first housing 141 has a circular cylindrical shape and accommodates the speed reduction device 1 mainly. The second housing 142 has a circular cylindrical shape and accommodates the motor 120 mainly.

The first and second housings 141 and 142 are fastened to each other by bolts or the like. Moreover, for example, the second housing 142 is fixed to the vehicle body by a bracket (not illustrated), and the first and second housings 141 and 142 do not rotate even when the motor 120 is driven.

<Clutch>

The clutch 150 is a device that disconnects or connects transmission of power between the operating-side shaft 111 and the pinion shaft 221 according to a command from the ECU 270. The clutch 150 is disposed below the reaction force actuator 100 and is fixed to the lower end of the second housing 142. In other words, the clutch 150 is connected to the operating-side shaft 111 that protrudes from the lower-end opening of the motor output shaft 121. Since the clutch 150 forms a part of the reaction force actuator 100 and is united with the motor 120, the speed reduction device 1, and the like, it is easy to handle the clutch 150. Moreover, it is possible to reduce the size of the reaction force actuator 100 including the clutch 150.

Moreover, during failure of the motor 120 and the steering force generator 251, since the clutch 150 can connect the operating-side shaft 111 and the pinion shaft 221 mechanically, the steering force input to the steering wheel 211 can be transmitted to the front wheels 301. Moreover, in a mechanically connected state, the steering force input to the steering wheel 211 may be assisted by the motor 120 of the reaction force actuator 100.

A specific configuration of the clutch 150 is not particularly limited, but an existing clutch such as a mechanical clutch that realizes connection/disconnection mechanically or an electromagnetic clutch that realizes connection/disconnection electromagnetically may be used. For example, a clutch that includes a planetary tooth mechanism and a cam member disclosed in Japanese Patent Application Publication No. 2006-123857 may be used.

<Speed Reduction Device>

The speed reduction device 1 is a friction drive transmission that is disposed on an upper side (the operating member side) of the reaction force actuator 100 so as to reduce (change) the speed of the rotary motion of the motor output shaft 121 and transmit the rotary motion to the operating-side shaft 111. That is, the speed reduction device 1 transmits power using frictional force on the contacting surface of rollers (described later) as driving force. The rollers are in pressure-contact with each other so that approximately no slip occurs between the rollers.

The friction drive in the present embodiment may be a type that transmits a rotary motion using frictional force only and may be a type (traction drive type) that transmits a rotary motion with a special oil film interposed between contacting surfaces. The speed reduction device 1 may be disposed on a lower side of the reaction force actuator 100 so as to reduce (change) the speed of the rotary motion of the motor output shaft 121 to the operating-side shaft 111 that protrudes from the lower-end opening of the motor output shaft 121 to transmit the rotary motion to the operating-side shaft 111.

The speed reduction device 1 includes a sun roller 11, a plurality of (three) planetary rollers 21, a ring roller (ring) 31, and a carrier 41.

<Sun Roller>

The sun roller 11 has a circular cylindrical shape and is fixed by being externally fitted to the upper end of the motor output shaft 121. That is, the sun roller 11 is fixed coaxially to the outer circumference of the motor output shaft 121. The sun roller 11 rotates integrally with the motor output shaft 121.

<Planetary Roller>

The planetary roller 21 has a circular columnar shape and rotates (revolves) about the axial line O1 while rotating (revolving) about the axial line O2 that passes through the center thereof. The planetary roller 21 is a roller that is disposed on the outer circumference (the outer side in the radial direction) of the sun roller 11 so as to roll on the outer circumferential surface of the sun roller 11. Moreover, the planetary roller 21 is a roller that is disposed on the inner circumference (the inner side in the radial direction) of the ring roller 31 so as to roll on the inner circumferential surface of the ring roller 31. That is, the planetary roller 21 rotates between the sun roller 11 and the ring roller 31 in a state of being sandwiched between the sun roller 11 and the ring roller 31 in the radial direction.

Three planetary rollers 21 are disposed at equal intervals (at an interval of 120°) in the circumferential direction while being rotatably supported by the carrier 41. When the planetary roller 21 revolves, the carrier 41 also revolves and the rotary motion of the motor output shaft 121 is transmitted to the operating-side shaft 111.

<Ring Roller>

The ring roller 31 is a ring-shaped member and is fixed by being internally fitted to the first housing 141. Since the first housing 141 is fixed to the vehicle body as described above, the ring roller 31 is also maintained in a non-rotating state. The inner circumferential surface of the ring roller 31 is inscribed by the planetary roller 21. The ring roller 31 is configured to generate preload pressure that presses the planetary roller 21 toward the inner side in the radial direction of the ring roller 31.

<Carrier>

The carrier 41 is a member that transmits a revolving motion of the planetary roller 21 to the operating-side shaft 111 while rotatably supporting three planetary roller 21 at equal intervals in the circumferential direction. The carrier 41 includes three shafts 41a, three arms 41b, and a fixed portion 41c.

The shaft 41a passes through the axial line O2 of the planetary roller 21 and rotatably supports the planetary roller 21.

The arm 41b extends inward in the radial direction from the upper end of the shaft 41a and is coupled with the fixed portion 41c. The three arms 41b are disposed at equal intervals in the circumferential direction.

The fixed portion 41c has a circular cylindrical shape and is fixed by being externally fitted to the operating-side shaft 111.

<Operation and Effect of Reaction Force Actuator and Speed Reduction Device>

The operation and effect of the reaction force actuator 100 and the speed reduction device 1 will be described.

Since the circular cylindrical motor output shaft 121 is disposed coaxially on the outer circumference (the outer side in the radial direction) of the operating-side shaft 111, it is possible to reduce the size of the reaction force actuator 100 as compared to a configuration in which the operating-side shaft 111 and the motor output shaft 121 are connected in series rather than overlap in the axial direction. Moreover, it is possible to form the reaction force actuator 100 that is compact in the radial direction of the operating-side shaft 111 as compared to a configuration in which a motor (the output shaft of the motor) for generating reaction force is disposed in parallel or vertically to the operating-side shaft 111.

When the motor 120 is driven and the motor output shaft 121 and the sun roller 11 rotate about the axial line O1 (see arrow A1 in FIGS. 4A and 4B), the planetary roller 21 contacting the sun roller 11 rotates about the shaft 41a (the axial line O2) (see arrow A2 in FIGS. 4A and 4B). The rotating planetary roller 21 rolls on the inner circumferential surface of the ring roller 31 that is in a non-rotating state, and as a result, the planetary roller 21 revolves about the axial line O1 (see arrow A3 in FIGS. 4A and 4B). Due to this, the carrier 41 having the shaft 41a that supports the planetary roller 21 also rotates about the axial line O1 (see arrow A4 in FIGS. 4A and 4B). Moreover, the operating-side shaft 111 to which the carrier 41 is fixed rotates and reaction force is applied to the steering wheel 211. That is, the rotary motion of the sun roller 11 (the motor output shaft 121) is decelerated and transmitted to the operating-side shaft 111.

A reduction ratio of the speed reduction device 1 is adjusted by changing the outer diameter of the sun roller 11, the outer diameter of the planetary roller 21, and the inner diameter of the ring roller 31. For example, the reduction ratio is adjusted between 1/3 and 1/20.

<Modification of First Embodiment>

While an embodiment of the present invention has been described, the present invention is not limited to this but may be changed in the following manner, for example.

In the above embodiment, although three planetary roller 21 are provided, the number of planetary rollers 21 may be changed appropriately.

Second Embodiment

A second embodiment of the present invention will be described with reference to FIG. 5 to FIGS. 7A and 7B. The differences from the first embodiment will be described mainly.

<Configuration of Speed Reduction Device>

A speed reduction device 2 according to the second embodiment includes a sun roller 11, three planetary rollers 22, a ring roller 31, and a carrier roller 42.

<Planetary Roller>

The planetary roller 22 includes a planetary roller body 22a (main body) having the same shape as the planetary roller 21 and a circular columnar driving unit 22b that protrudes upward (toward the operating member) from an upper end surface of the planetary roller body 21a. The centers of the planetary roller body 22a and the driving unit 22b are on the axial line O2. The outer diameter (diameter) of the driving unit 22b is smaller than the outer diameter (diameter) of the planetary roller body 22a.

The planetary roller body 22a is in contact with the outer circumferential surface of the sun roller 11 and the inner circumferential surface of the ring roller 31 similarly to the planetary roller 21. When the motor 120 is driven and the motor output shaft 121 and the sun roller 11 rotate, the planetary roller body 22a (the planetary roller 22) revolves about the axial line O1 while rotating about the axial line O2.

The driving unit 22b is in contact with the inner circumferential surface of a driven portion 42a (described later). When the driving unit 22b revolves about the axial line O1 while rotating about the axial line O2, the driven portion 42a rotates about the axial line O1 due to frictional force between the driving unit 22b and the driven portion 42a.

<Carrier Roller>

The carrier roller 42 is a member that transmits a revolving motion of the planetary roller 22 to the operating-side shaft 111. The carrier roller 42 has a bottomed circular cylindrical shape of which the upper side is approximately closed and includes a circular cylindrical driven portion 42a and a ring-shaped connecting portion 42b that extends inward in the radial direction from the upper end of the driven portion 42a and is connected to the operating-side shaft 111.

The inner side in the radial direction of the driven portion 42a is in contact with the outer side in the radial direction of three driving units 22b. Due to this, when the driving unit 22b revolves while rotating, the driven portion 42a (the carrier roller 42) rotates.

<Operation and Effect of Speed Reduction Device>

Figures 7A, 7B:
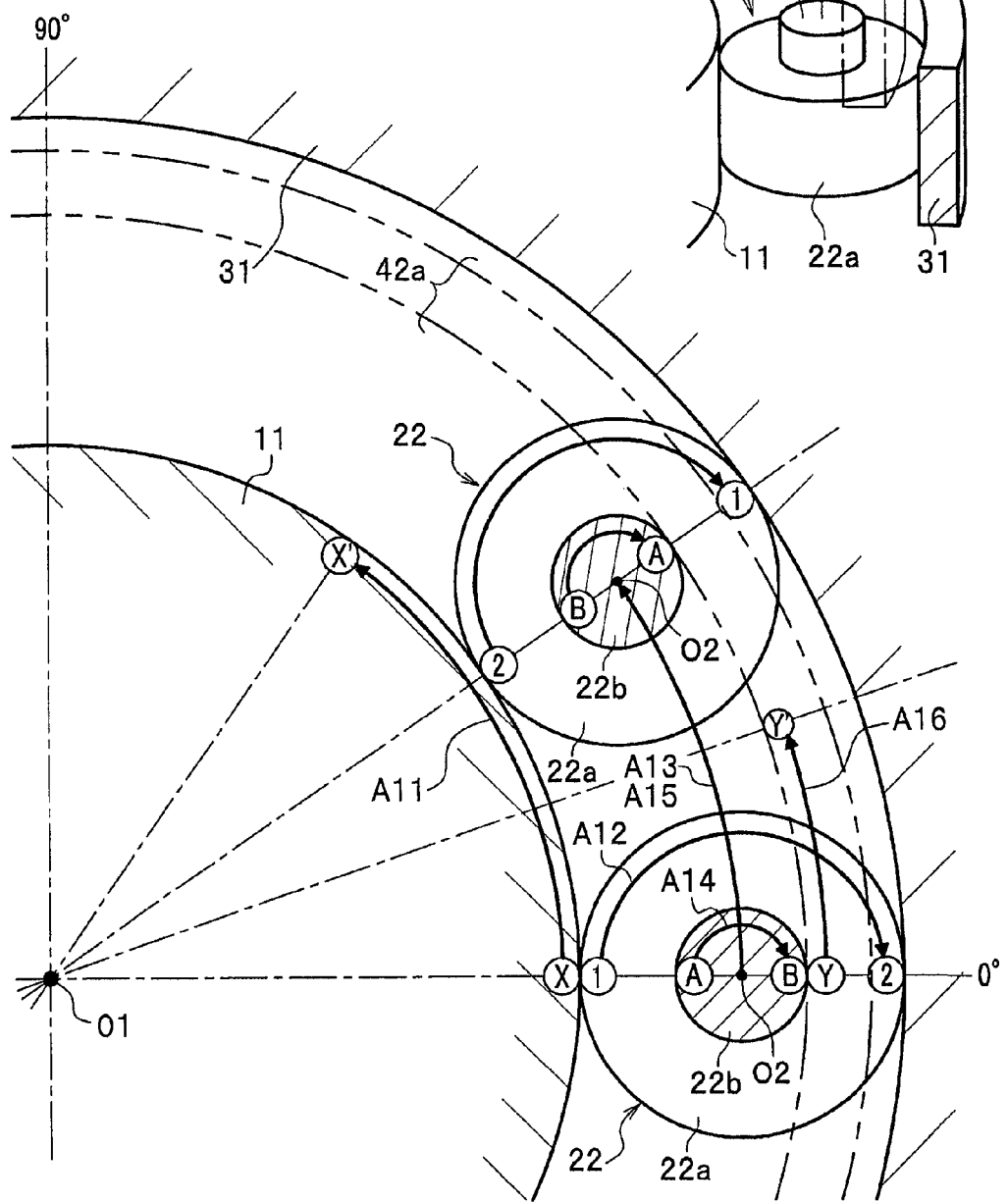
FIG. 7A is a diagram for describing an operation of the reaction force actuator according to the second embodiment and FIG. 7B is a perspective view of a planetary roller.

When the motor 120 is driven and the sun roller 11 rotates about the axial line O1 (see A11 in FIGS. 7A and 7B), the planetary roller body 22a contacting the sun roller 11 rotates about the axial line O2 (see arrow A12 in FIGS. 7A and 7B). The rotating planetary roller body 22a rolls on the inner circumferential surface of the ring roller 31 that is in a non-rotating state, and as a result, the planetary roller body 22a revolves about the axial line O1 (see arrow A13 in FIGS. 7A and 7B).

At the same time, the driving unit 22b which is integrated with the planetary roller body 22a also revolves about the axial line O1 (see arrow A15 in FIGS. 7A and 7B) while rotating about the axial line O2 (see arrow A14 in FIGS. 7A and 7B). In this case, since the rotating or revolving driving unit 22b is in frictional contact with the driven portion 42a, the driven portion 42a rotates about the axial line O1 in a state in which the length of the rotating circumference of the driving unit 22b is decreased (see arrow A16 in FIGS. 7A and 7B). That is, since the length of the rolling circumference of the planetary roller body 22a is larger than the length of the rotating circumference of the driving unit 22b, the driven portion 42a rotates in the same direction as the sun roller 11 so as to correspond to the difference in the length.

In this manner, since the driven portion 42a rotates in a state in which the length of the rotating circumference of the driving unit 22b is decreased, the rotary motion of the sun roller 11 (the motor output shaft 121) is decelerated and transmitted to the carrier roller 42 (the operating-side shaft 111).

Figure 8A:
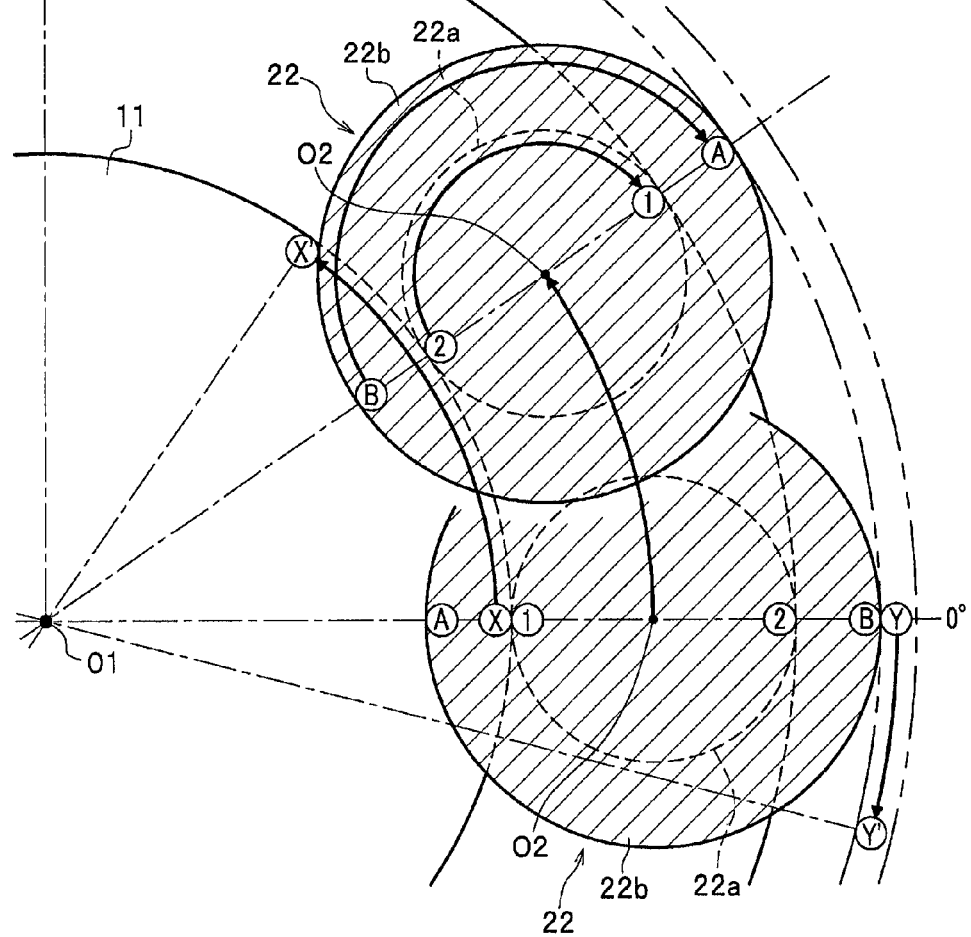
FIG. 8A is a diagram for describing an operation of a reaction force actuator according to a modification and FIG. 8B is a perspective view of a planetary roller.
Figure 8B:
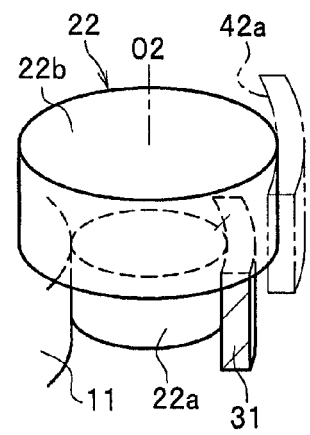

Moreover, as illustrated in FIGS. 8A and 8B, when the outer diameter of the driving unit 22b is larger than the outer diameter of the planetary roller body 22a, the length of the rotating circumference of the driving unit 22b is larger than the length of the rolling circumference of the planetary roller body 22a. Thus, in this case, the driven portion 42a (the carrier roller 42) rotates in an opposite direction to the sun roller 11 (the motor output shaft 121).

<Modification of Second Embodiment>

In the above embodiment, the inner side in the radial direction of the driven portion 42a is in contact with the outer side in the radial direction of the three driving units 22b. However, the outer side in the radial direction of the driven portion 42a may be in contact with the inner side in the radial direction of the three driving units 22b, for example. However, in this case, the rotating direction of the sun roller 11 (the motor output shaft 121) is opposite to the rotating direction of the driven portion 42a (the carrier roller 42 and the operating-side shaft 111).

Figure 9:
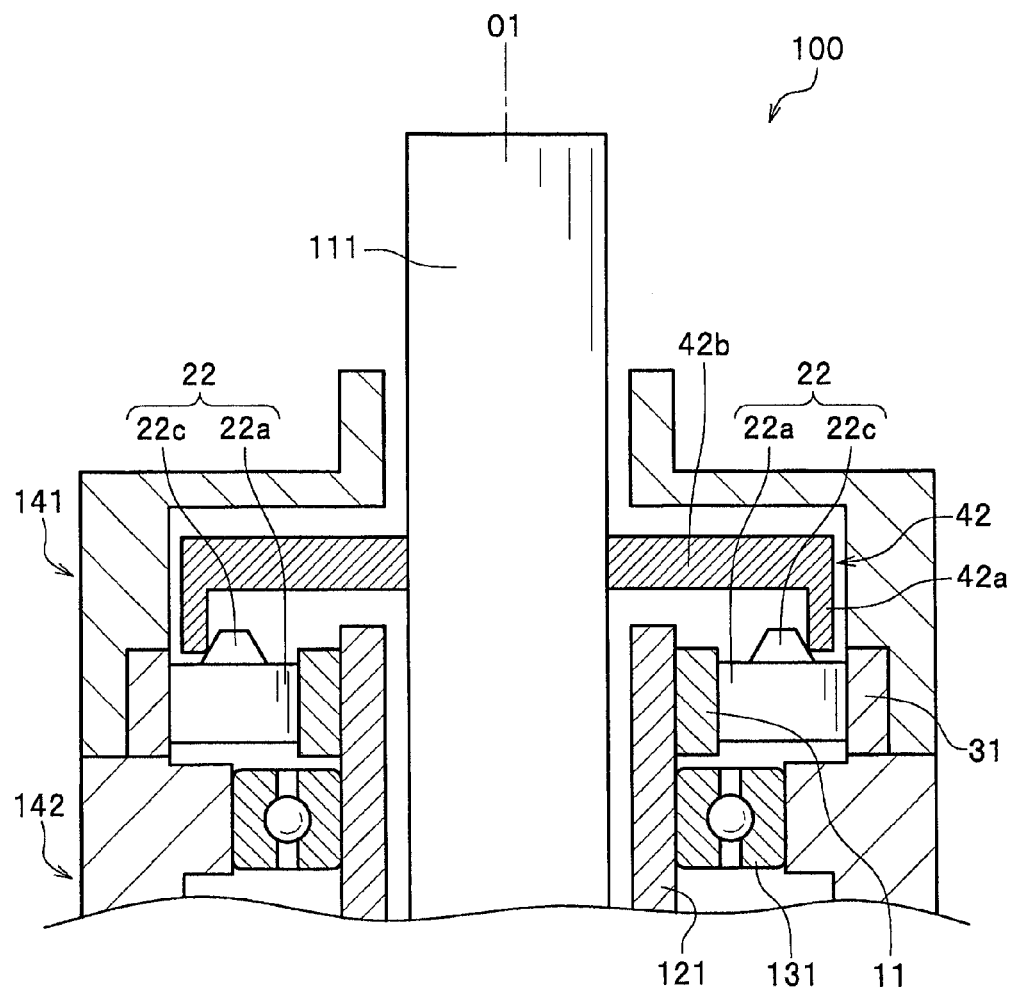
FIG. 9 is a longitudinal sectional view of the reaction force actuator according to the modification.

In the above embodiment, the planetary roller 22 includes the circular columnar driving unit 22b. However, as illustrated in FIG. 9, the planetary roller 22 may include a truncated conical driving unit 22c instead of the driving unit 22b, for example. According to this configuration, since a tapered outer circumferential surface of the driving unit 22c makes contact with the driven portion 42a in the axial direction, the driven portion 42a can be preloaded against the driving unit 22c satisfactorily.

Third Embodiment

Figure 10:
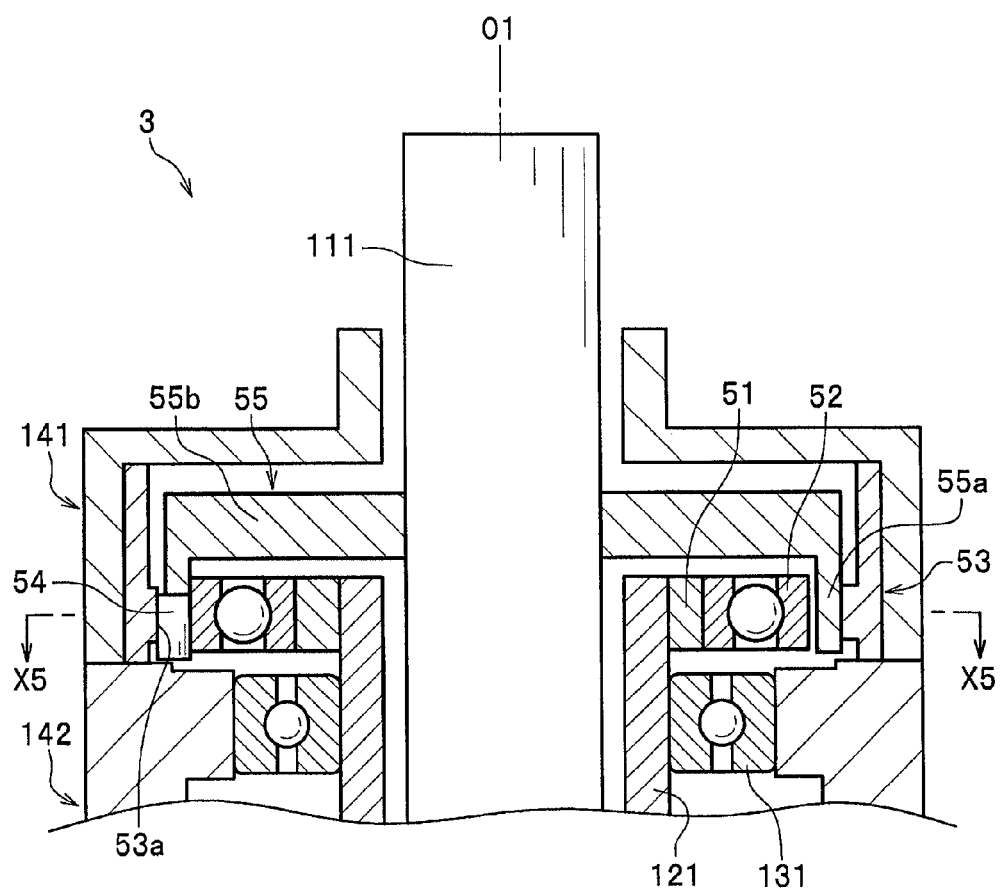
FIG. 10 is a longitudinal sectional view (along line X6-X6 in FIG. 11) of a reaction force actuator according to a third embodiment.

A third embodiment of the present invention will be described with reference to FIGS. 10 and 11.

<Configuration of Speed Reduction Device>

A speed reduction device 3 according to the third embodiment includes a eccentric portion 51, a bearing 52, a cam ring 53, fifteen rollers 54, and a holder 55 as disclosed in Japanese Patent No. 5376288, for example.

<Eccentric Portion>

The eccentric portion 51 has a thick disc shape of which the center is on an axial line O3 and is fixed to the motor output shaft 121 in an eccentric manner. That is, the axial line O3 that passes through the center of the eccentric portion 51 is shifted from the axial line O1 that passes through the center of the motor output shaft 121.

Figure 11:
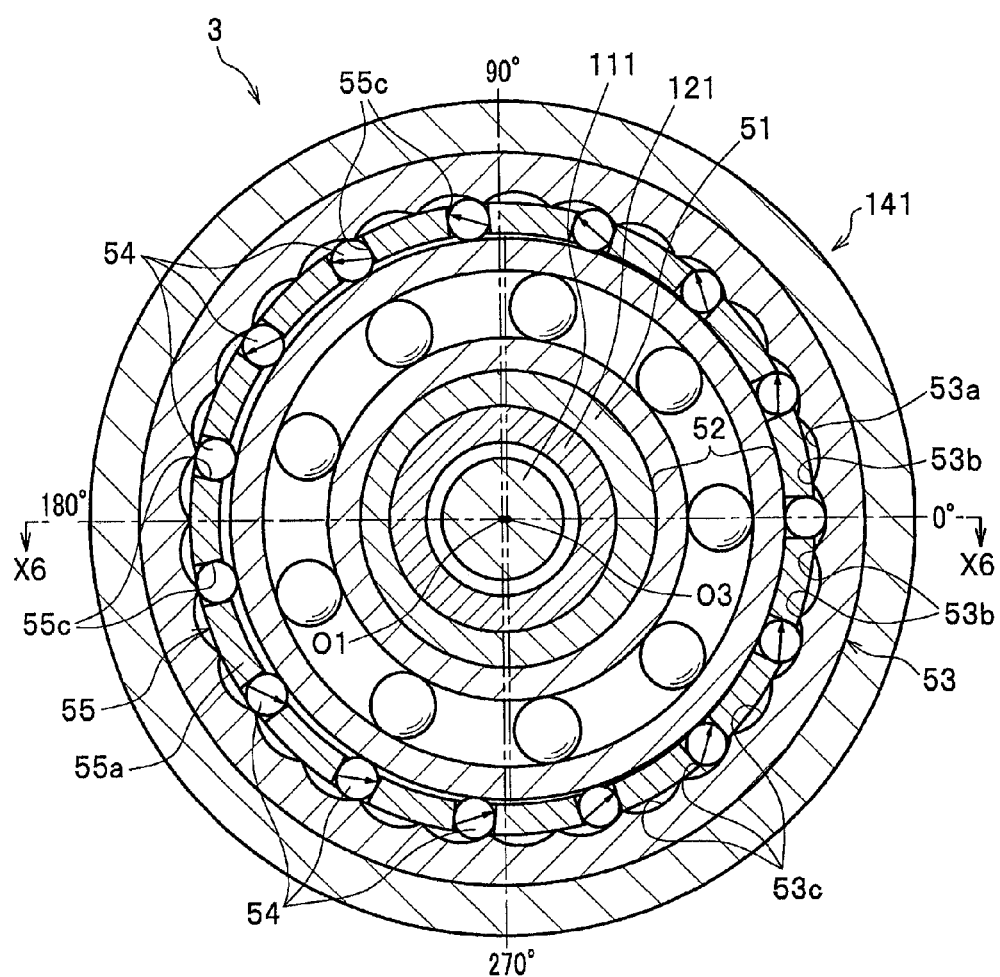
FIG. 11 is a cross-sectional view (along line X5-X5 in FIG. 10) of the reaction force actuator according to the third embodiment.

Specifically, in FIG. 11, the gap between the outer circumferential surface of the bearing 52 and a holding portion 55a of a holder 55 is between 0° (minimum) and 180° (maximum). That is, the amount of eccentricity about the axial line O1 (the distance between the axial line O1 and the outer circumferential surface of the eccentric portion 51) is between 0° (maximum) and 180° (minimum). The amount of eccentricity decreases gradually as it advances from 0° to 180° and increases gradually as it advances from 180° to 360° (0°).

<Bearing>

The bearing 52 is a bearing that supports the load in the radial direction and is a radial ball bearing, for example. The bearing 52 is fixed by being externally fitted to the eccentric portion 51.

<Cam Ring>

The cam ring 53 is a circular cylindrical member and is fixed by being internally fitted to the first housing 141. Thus, the cam ring 53 does not rotate.

A cam surface 53a is formed on the inner circumferential surface of the cam ring 53. In this example, the cam surface 53a includes twenty-nine cam ridges 53b that protrude inward in the radial direction and twenty-nine cam grooves 53c that are depressed outward in the radial direction. The cam ridge 53b and the cam groove 53c are alternately disposed in the circumferential direction.

<Roller>

The fifteen rollers 54 are rolling members that have a circular columnar shape and revolve between the bearing 52 and the cam ring 53 while rotating due to frictional force. The fifteen rollers 54 are arranged at equal intervals in the circumferential direction by the holder 55.

Here, the number (15) of rollers 54 is neither identical to the number (29) of cam ridges 53b or cam grooves 52c or the multiples thereof. Due to this, with rotation of the eccentric portion 51, some of the rollers 54 are pushed toward the outer side in the radial direction and moved toward the cam grooves 53c and the others are pushed toward the inner side in the radial direction and moved toward the cam ridges 53b. As a result, the holder 55 rotates.

<Holder>

The holder 55 holds the fifteen rollers 54 so as to be arranged at equal intervals and transmits a revolving motion of the rollers 54 to the operating-side shaft 111. The holder 55 has a bottomed circular cylindrical shape of which the upper side is approximately closed and includes a circular cylindrical holding portion 55a and a supporting portion 55b that extends inward in the radial direction from the upper end of the holding portion 55a and is supported by the operating-side shaft 111.

Fifteen notch-shaped pockets 55c that rotatably hold the rollers 54 are formed in the holding portion 55a. The fifteen pockets 55c are disposed at equal intervals in the circumferential direction.

The holder 55 may not have the pockets 55c, and for example, similarly to the carrier 41 of the first embodiment, the holder 55 may transmit a revolving motion of the rollers 54 to the operating-side shaft 111 while rotatably supporting the rollers 54 at equal intervals in the circumferential direction with the aid of the shaft that passes through the axial line of the roller 54.

<Operation and Effect of Speed Reduction Device>

The operation and effect of the speed reduction device 3 will be described with reference to FIG. 11. In this example, the eccentric portion 51 rotates left in FIG. 11.

When the eccentric portion 51 rotates by 180°, the rollers 54 in the range of 0° to 180° in FIG. 11 are pushed toward the outer side in the radial direction and moved toward the cam grooves 53c while rolling on the cam surface 53a because the amount of eccentricity increases gradually. On the other hand, the rollers 54 in the range of 180° to 360° (0°) are pushed toward the inner side in the radial direction and moved toward the cam ridges 53b while rolling on the cam surface 53a because the amount of eccentricity decreases gradually.

Since the roller 54 rolls on the cam surface 53a in this manner (that is, since the roller 54 revolves while rotating), the holder 55 that holds the roller 54 rotates. In this example, when the eccentric portion 51 makes one rotation, the roller 54 moves to an immediately adjacent cam (that made up of one cam ridge 53b and one cam groove 54c) in the circumferential direction. That is, the rotary motion of the eccentric portion 51 (the motor output shaft 121) is decelerated and transmitted to the holder 55 (the operating-side shaft 111).

EXPLANATION OF REFERENCE NUMERALS 1, 2, 3: Speed reduction device (Transmission)
11: Sun roller
21, 22: Planetary roller
22a: Planetary roller body
22b: Driving unit
31: Ring roller
41: Carrier
42: Carrier roller
51: Eccentric portion
53: Cam ring
55: Holder
100: Reaction force actuator
111: Operating-side shaft
120: Motor
121: Motor output shaft
150: Clutch (Connecting and disconnecting device)
200: Steering device
211: Steering wheel (Operating member)
212: Column shaft
221: Pinion shaft (Steered wheel-side shaft)
270: ECU
301: Front wheel (Steered wheel)

What is claimed is:

1. A reaction force actuator to be used in a steer-by-wire steering device, comprising:
    an operating-side shaft that rotates integrally with an operating member that a driver operates;
    a motor that comprises a cylindrical motor output shaft disposed coaxially on an outer circumference of the operating-side shaft; and
    a friction drive transmission that changes a speed of a rotary motion of the motor output shaft and transmits the rotary motion to the operating-side shaft, wherein the friction drive transmission comprises:
        a sun roller fixed coaxially on an outer circumference of the motor output shaft;
        a plurality of planetary rollers disposed on an outer circumference of the sun roller to make contact with an outer circumferential surface of the sun roller;
        a non-rotating ring that is inscribed by the planetary rollers; and
        a carrier that rotatably supports the planetary rollers and is directly fixed to the operating-side shaft.

2. The reaction force actuator according to claim 1, further comprising:
    a connecting and disconnecting device that connects and disconnects transmission of power between the operating-side shaft and a steered wheel-side shaft connected to a steered wheel.

3. The reaction force actuator according to claim 2, wherein
    a carrier roller that is fixed to the operating-side shaft,
    each of the planetary rollers comprises a main body that makes contact with the sun roller and the ring, and a driving unit that is disposed coaxially with the main body and has a diameter different from that of the main body, and
    the carrier roller makes contact with the driving unit.

4. The reaction force actuator according to claim 3, wherein
    the driving unit has a truncated conical shape that is coaxial with the main body.

5. A steer-by-wire steering device comprising:
    the reaction force actuator according to claim 1.

6. A steer-by-wire steering device comprising:
    the reaction force actuator according to claim 2.

7. A reaction force actuator to be used in a steer-by-wire steering device, comprising:
    an operating-side shaft that rotates integrally with an operating member that a driver operates;
    a motor that comprises a cylindrical motor output shaft disposed coaxially on an outer circumference of the operating-side shaft; and
    a friction drive transmission that changes a speed of a rotary motion of the motor output shaft and transmits the rotary motion to the operating-side shaft, wherein the friction drive transmission comprises:
        a sun roller that is fixed coaxially on an outer circumference of the motor output shaft;
        a plurality of planetary rollers that are disposed on an outer circumference of the sun roller so as to make contact with an outer circumferential surface of the sun roller;
        a non-rotating ring that is inscribed by the planetary rollers; and a carrier roller that is fixed to the operating-side shaft,
    each of the planetary rollers comprises a main body that makes contact with the sun roller and the ring, and a driving unit that is disposed coaxially with the main body and has a diameter different from that of the main body, and
    the carrier roller makes contact with the driving unit.

8. The reaction force actuator according to claim 7, wherein
    the driving unit has a truncated conical shape that is coaxial with the main body.

9. A steer-by-wire steering device comprising:
    the reaction force actuator according to claim 8.

10. A steer-by-wire steering device comprising:
    the reaction force actuator according to claim 7.

* * * * *